United States Patent
Iida et al.

(10) Patent No.: US 9,760,745 B2
(45) Date of Patent: Sep. 12, 2017

(54) SIGNAL PROCESSING DEVICE, METHOD OF PROCESSING SIGNAL, AND RECORDING MEDIUM

(71) Applicant: Sony Corporation, Tokyo (JP)

(72) Inventors: Yasuhiro Iida, Tokyo (JP); Kazuhiro Oguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 485 days.

(21) Appl. No.: 14/157,007

(22) Filed: Jan. 16, 2014

(65) Prior Publication Data

US 2014/0210597 A1 Jul. 31, 2014

(30) Foreign Application Priority Data

Jan. 25, 2013 (JP) ................................. 2013-012016

(51) Int. Cl.
| | |
|---|---|
| *H04Q 5/22* | (2006.01) |
| *G06K 7/10* | (2006.01) |
| *H04L 7/04* | (2006.01) |
| *H04L 25/06* | (2006.01) |
| *H04L 27/06* | (2006.01) |
| *H04L 27/148* | (2006.01) |

(52) U.S. Cl.
CPC ............ *G06K 7/10009* (2013.01); *H04L 7/04* (2013.01); *H04L 25/061* (2013.01); *H04L 27/06* (2013.01); *H04L 27/148* (2013.01)

(58) Field of Classification Search
None
See application file for complete search history.

(56) References Cited

U.S. PATENT DOCUMENTS

| | | | | |
|---|---|---|---|---|
| 6,038,267 | A * | 3/2000 | Oura | H04L 1/06 329/304 |
| 2008/0205558 | A1* | 8/2008 | Arnitz | H04L 7/042 375/340 |
| 2008/0231425 | A1* | 9/2008 | Sano | H03D 3/007 340/10.1 |
| 2009/0101716 | A1* | 4/2009 | Mani | G06K 7/0008 235/441 |
| 2009/0280763 | A1* | 11/2009 | Witschnig | H04L 27/02 455/205 |
| 2010/0124258 | A1* | 5/2010 | Sekiguchi | G06K 7/0008 375/219 |

FOREIGN PATENT DOCUMENTS

JP 2009-508384 2/2009

\* cited by examiner

*Primary Examiner* — Brian Zimmerman
*Assistant Examiner* — Kevin Lau
(74) *Attorney, Agent, or Firm* — Chip Law Group

(57) ABSTRACT

A signal processing device includes: an extraction section configured to extract a signal having a predetermined component from an obtained signal; and a detection section configured to determine a timing of decoding when a modulation part lasting for a first time period and a non-modulation part lasting for a second time period are detected from the signal extracted by the extraction section.

12 Claims, 13 Drawing Sheets

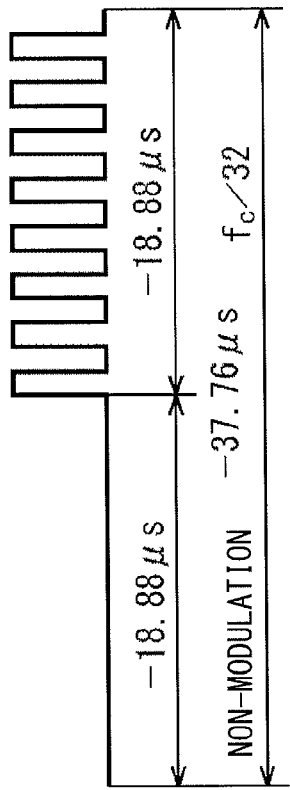
FIG. 2B  Logic 1
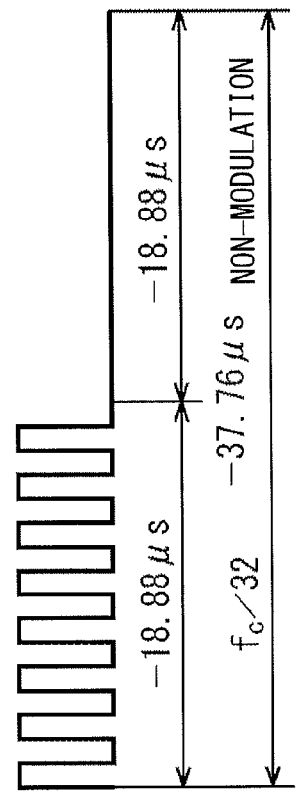
FIG. 2A  Logic 0

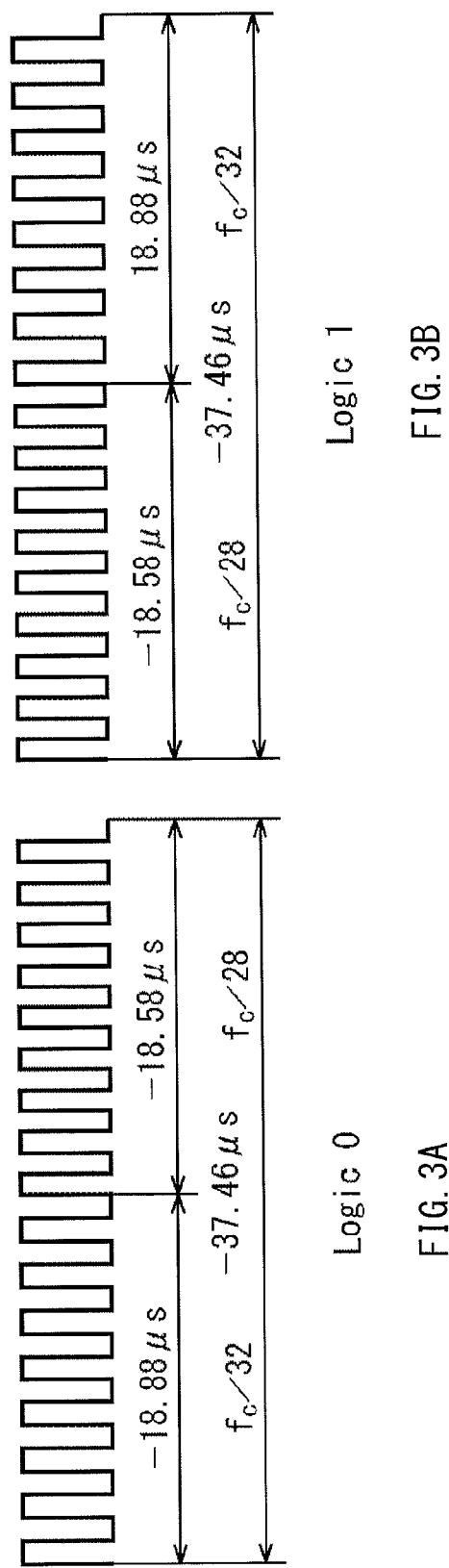

SIGNAL PROCESSING DEVICE, METHOD OF PROCESSING SIGNAL, AND RECORDING MEDIUM

CROSS REFERENCE TO RELATED APPLICATIONS

This application claims the benefit of Japanese Priority Patent Application JP 2013-012016 filed Jan. 25, 2013, the entire contents of each which are incorporated herein by reference.

BACKGROUND

The present technology relates to a signal processing device, to a method of processing a signal, and to a recording medium. Specifically, the present technology relates to a signal processing device, a method of processing a signal, and a recording medium that detect a predetermined signal and to allow the detected signal to be processed.

In recent years, an RFID (Radio Frequency Identification) system has been widely spread. The RFID system attaches information (identification information) for identifying an individual such as a device, a package, a human, and other living thing to the individual with the use of a device called "RF tag". In the RFID system, a wireless transceiver called "reader-writer" and the tag perform wireless communication therebetween.

Typically, the RFID system stores data in a built-in semiconductor memory, reads the data in the semiconductor memory, and transmits the read data by short-distance communication through an induced electromagnetic field or a radio wave. Alternatively, the RFID system receives transmitted data, and writes the received data in the semiconductor memory. In particular, a device that reads the data from the RFID is called "reader", and a device that writes the data in the RFID is called "writer". In general, an information medium that is an RFID capable of at least reading stored data is called "RF tag".

The RFID is configured of a semiconductor integrated circuit chip including an antenna and a semiconductor memory, and receives a radio wave with the use of the antenna. Some RFIDs generate electric power necessary for operation with the use of the received radio wave or electromagnetic coupling with the reader or the writer. The RFID that communicates with the reader generates a reflected wave that is varied depending on the stored data (by varying a load of the electromagnetic coupling), and allows the reader to read the data.

It is to be noted that the RF tag is also referred to as a data carrier, a transponder, a smart card, an intellitag, a wireless IC tag, a non-contact type IC tag, etc.

The reader in the RFID system may have, for example, a function to detect a signal pattern that represents a first data frame (SOF: Start Of Frame) included in the signal transmitted from the RF tag. In some RFID system standards, two different signal patterns are provided for SOF. For example, a signal pattern of an SOF in accordance with International Standard ISO15693 has two patterns, that are, a pattern of "One Subcarrier" and a pattern of "Two Subcarriers".

Japanese Unexamined Patent Publication Application (Translation of PCT Application) No. 2009-508384 (JP2009-508384A) discloses a device that detects an SOF corresponding to "One Subcarrier". JP2009-508384A proposes a method to determine a cross-correlation function between the received signal and the reference SOF pattern, and to detect a timing of the SOF based on the time when a value of the cross-correlation function reaches a peak.

SUMMARY

A lot of amount of calculation is necessary in calculating the cross-correlation function. Further, in this method, it is necessary to provide SOF detection means different from each other corresponding to both of the provided two patterns of modes of SOF. Therefore, a circuit size, power consumption, etc. may be increased.

On the other hand, in recent years, the number of cases where the RFID reader-writer is built in as a function of NFC-compliant IC chip has been increased. According to such wide use of built-in RFID reader-writer, it is desired to further reduce power consumption, circuit size, etc. of the RFID reader-writer.

It is desirable to provide a signal processing device, a method of processing a signal, and a recording medium that are capable of processing signals having different patterns and of further reducing power consumption, circuit size, etc.

A signal processing device according to an embodiment of the present technology includes: an extraction section configured to extract a signal having a predetermined component from an obtained signal; and a detection section configured to determine a timing of decoding when a modulation part lasting for a first time period and a non-modulation part lasting for a second time period are detected from the signal extracted by the extraction section.

The detection section may detect an SOF (Start Of Frame) defined in International Standard ISO/IEC15693.

The extraction section may extract a component at $f_c/32$ where $f_c$ is a frequency of a carrier magnetic field.

The extraction section may include a first extraction section and a second extraction section, the first extraction section being configured to extract a component at $f_c/32$, and the second extraction section being configured to extract a component at $f_c/28$, where $f_c$ is a frequency of a carrier magnetic field. The detection section may detect the modulation part lasting for the first time period and the non-modulation part lasting for the second time period from a signal configured of a difference between a signal supplied from the first extraction section and a signal supplied from the second extraction section.

The extraction section may include a first extraction section and a second extraction section, the first extraction section being configured to extract a signal obtained by removing a component at $f_c/32$ from the obtained signal, and the second extraction section being configured to extract a signal obtained by removing a component at $f_c/28$ from the obtained signal, where $f_c$ is a frequency of a carrier magnetic field. The detection section may detect the modulation part lasting for the first time period and the non-modulation part lasting for the second time period from a signal configured of a difference between a signal supplied from the first extraction section and a signal supplied from the second extraction section.

A predetermined time tolerance may be set for one or both of the first time period and the second time period. When the predetermined time tolerance is set for the first time period and the first time period is within the predetermined time tolerance, the detection section may determine that the modulation part is detected. When the predetermined time tolerance is set for the second time period and the second time period is within the predetermined time tolerance, the detection section may determine that the non-modulation part is detected.

A method of processing a signal according to an embodiment of the present technology includes: extracting a signal having a predetermined component from an obtained signal; and determining a timing of decoding when a modulation part lasting for a first time period and a non-modulation part lasting for a second time period are detected from the extracted signal.

A recording medium according to an embodiment of the present technology stores a program readable by a computer executing processing, the processing including: extracting a signal having a predetermined component from an obtained signal; and determining a timing of decoding when a modulation part lasting for a first time period and a non-modulation part lasting for a second time period are detected from the extracted signal.

According to the signal processing device, the method of processing a signal, and the recording medium of the above-described embodiments of the present technology, a timing of decoding is determined when the signal having the predetermined component is extracted from the obtained signal, and the modulation part lasting for the first time period and the non-modulation part lasting for the second time period are detected from the extracted signal.

According to the above-described embodiments of the present technology, signals having different patterns are allowed to be processed. Further, power consumption, circuit size, etc. at the time of processing the signals having different patterns are reduced.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIGS. 2A and 2B are diagrams for explaining about signals transmitted and received in the system.

FIGS. 3A and 3B are diagrams for explaining about signals transmitted and received in the system.

DETAILED DESCRIPTION

Some embodiments for carrying out the present technology (hereinafter, referred to as "embodiment(s)") will be described below. The description will be given in the following order.

1. Configuration of System
2. Concerning Signals to be Transmitted and Received
3. Configuration and Processing of Demodulation Section in First Embodiment
4. Configuration and Processing of Demodulation Section in Second Embodiment
5. Configuration and Processing of Demodulation Section in Third Embodiment
6. Concerning Recording Medium

[Configuration of System]

Figure 1:
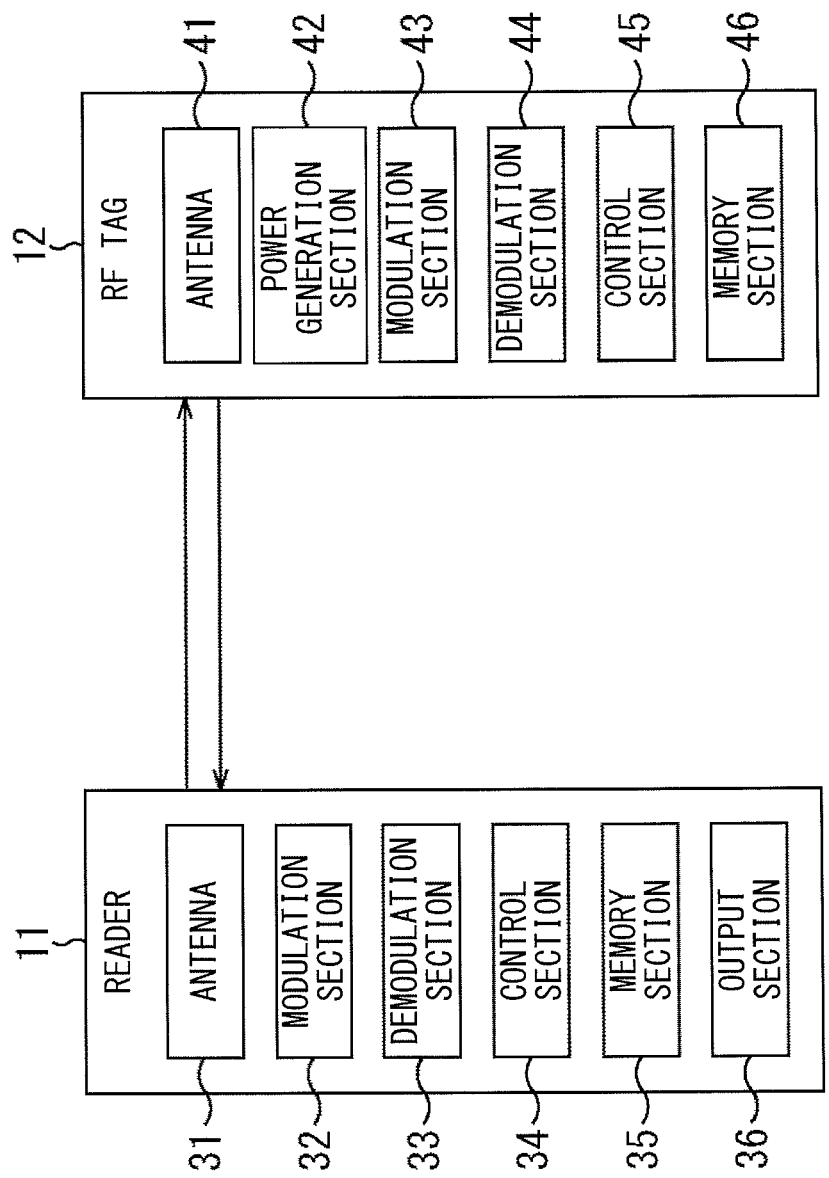
FIG. 1 is a diagram illustrating a configuration of a wireless communication system.

FIG. 1 is a diagram for explaining about an RF tag and a reader that configure a wireless communication system. In other words, FIG. 1 is a block diagram for explaining configurations of the reader and the RF tag that configure the wireless communication system, and that transmit and receive data by wireless communication.

The wireless communication system shown in FIG. 1 includes a reader 11 and an RF tag 12. The reader 11 includes an antenna 31, a modulation section 32, a demodulation section 33, a control section 34, a memory section 35, and an output section 36. The RF tag 12 includes an antenna 41, a power generation section 42, a modulation section 43, a demodulation section 44, a control section 45, and a memory section 46.

The reader 11 transmits, to the RF tag 12, a signal (hereinafter, referred to as "request signal") that requests transmission of data by wireless communication. The RF tag 12 receives the request signal transmitted from the reader 11. The RF tag 12 transmits data to the reader 11 by wireless communication in response to the received request signal. Then, the reader 11 receives the data transmitted from the RF tag 12.

The control section 34 in the reader 11 controls whole of the reader 11. For example, the control section 34 may generate a request signal, and supplies the generated request signal to the modulation section 32. The modulation section 32 modulates the request signal supplied from the control section 34 by a predetermined modulation method. The antenna 31 transmits the modulated request signal to the RF tag 12 by wireless communication. In other words, the antenna 31 radiates a radio wave (an electromagnetic wave) that transmits the request signal.

The antenna 41 in the RF tag 12 receives the request signal transmitted from the antenna 31. When the antenna 41 receives the request signal, the power generation section 42 generates direct-current (DC) electric power using alternate-current (AC) electromotive force excited in the antenna 41 resulting from the reception of the request signal, and supplies the generated DC electric power to each section in the RF tag 12.

More specifically, the antenna 31 continues to radiate the radio wave during a period in which the reader 11 performs wireless communication with the RF tag 12. The antenna 41 receives the radiated radio wave, and continuously generates the electromotive force. The power generation section 42 generates DC electric power using the electromotive force generated in the antenna 41, and continuously supplies, to each section in the RF tag 12, DC electric power necessary for the RF tag 12 to operate.

The reader 11 may be electromagnetically coupled to the RF tag 12, and may supply electric power to the RF tag 12 through the electromagnetic coupling.

In this case, a user places the reader 11 close to the RF tag 12, and thereby, the antenna 31 is electromagnetically coupled to the antenna 41. The power generation section 42 in the RF tag 12 rectifies, through the electromagnetic coupling, the alternate current that is generated in accordance with the alternate current in the antenna 31 and flows through the antenna 41, stabilizes the rectified current, and thereby, generates DC electric power. The power generation section 42 supplies the generated DC electric power to each section in the RF tag 12.

The antenna 41 in the RF tag 12 supplies the received request signal to the demodulation section 44. The demodulation section 44 demodulates the supplied request signal by a demodulation method in correspondence with the modulation method used by the modulation section 32 in the reader 11. The control section 45 reads (obtains) data from the memory section 46 based on the demodulated request signal, and supplies the read data to the modulation section 43. The memory section 46 holds various types of data.

The modulation section 43 modulates the data supplied from the control section 45 by a predetermined method, and supplies the modulated data to the antenna 41. The antenna 41 transmits the modulated data to the reader 11 by wireless communication.

The antenna 31 in the reader 11 receives the data transmitted from the RF tag 12. The demodulation section 33 demodulates the received data by a demodulation method in correspondence with the modulation method used by the modulation section 43.

For example, when the antenna 31 is electromagnetically coupled to the antenna 41, the modulation section 43 varies the load of the antenna 41 over time in accordance with the data to be transmitted. As a result, electromotive force (voltage) that is in accordance with the data and varies over time is generated in the antenna 31. The demodulation section 33 demodulates a signal configured of the voltage that is generated in the antenna 31 and varies over time, and supplies the data obtained by the demodulation to the memory section 35.

The memory section 35 records the data demodulated by the demodulation section 33. The control section 34 reads, from the memory section 35, the data recorded in the memory section 35, and supplies the read data to the output section 36. The output section 36 may display, for example, an image based on the data supplied from the control section 34.

In such a manner, the reader 11 and the RF tag 12 perform wireless communication, and the reader 11 receives desirable data from the RF tag 12.

It is to be noted that, in the present embodiment, the reader 11 and the RF tag 12 are configured to perform communication through electromagnetic coupling. However, this is not limitative, and the reader 11 and the RF tag 12 may perform communication through other medium as long as its communication method is based on a principle similar to that of the RFID.

[Concerning Signal to be Transmitted and Received]

Description will be given of a signal to be transmitted and received in the wireless communication system shown in FIG. 1. As described above, the reader 11 in the RFID system detects that amplitude of a carrier-wave magnetic field generated by the reader 11 itself is modulated due to the modulation of the load of the RF tag 12, and demodulates the received signal.

Where a frequency of the carrier-wave magnetic field is $f_c$, International Standard ISO/IEC15693 defines two modes, that are, "One Subcarrier" mode that uses only a subcarrier at $f_c/32$ (uses one subcarrier), and "Two Subcarriers" mode that uses the subcarrier at $f_c/32$ and a subcarrier at $f_c/28$ (uses two subcarriers). Further, for each of the two modes, patterns of "Logic 0" and "Logic 1" that each represent information of 1 bit are defined.

FIGS. 2A and 2B illustrate waveforms of a pattern of "Logic 0" and a pattern of "Logic 1" in "One Subcarrier" mode, respectively. FIGS. 3A and 3B are waveforms of a pattern of "Logic 0" and a pattern of "Logic 1" in "Two Subcarriers" mode, respectively.

A bit representing "0" in a case where one subcarrier is used is coded (is modulated) as shown in FIG. 2A. Logic 0 shown in FIG. 2A in the case where one subcarrier is used is a signal that begins with eight pulses at $f_c/32$ (=423.75 kHz) for 18.88 μs, and includes a non-modulation period for $256/f_c$ (18.88 μs) subsequent to the eight pulses.

A bit representing "1" in the case where one subcarrier is used is coded (is modulated) as shown in FIG. 2B. Logic 1 shown in FIG. 2B in the case where one subcarrier is used is a signal that begins with a non-modulation period for $256/f_c$ (18.88 μs), and includes eight pulses at $f_c/32$ (=423.75 kHz) for 18.88 μs subsequent to the non-modulation period.

A bit representing "0" in a case where two subcarriers are used is coded (is modulated) as shown in FIG. 3A. Logic 0 shown in FIG. 3A in the case where two subcarriers are used is a signal that begins with eight pulses at $f_c/32$ (=423.75 kHz) for 18.88 μs, and includes nine pulses at $f_c/28$ (=484.28 kHz) for 18.58 μs subsequent to the eight pulses.

A bit representing "1" in the case where two subcarriers are used is coded (is modulated) as shown in FIG. 3B. Logic 1 shown in FIG. 3B in the case where two subcarriers are used is a signal that begins with nine pulses at $f_c/28$ (=484.28 kHz) for 18.58 μs, and includes eight pulses at $f_c/32$ (=423.75 kHz) for 18.88 μs subsequent to the nine pulses.

Figure 4A:
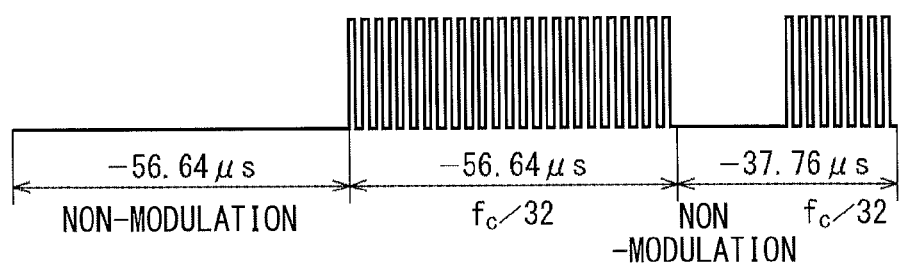
FIGS. 4A and 4B are diagrams for explaining about signals transmitted and received in the system.

On the other hand, separately from these patterns, an SOF (Start Of Frame) that indicates a timing of starting communication is defined. FIG. 4A illustrates a waveform of an SOF in "One Subcarrier" mode, and FIG. 4B illustrates a waveform of an SOF in "Two Subcarriers" mode.

An SOF in the case where one subcarrier is used is coded (is modulated) as shown in FIG. 4A. A pattern of the SOF in the case where one subcarrier is used shown in FIG. 4A has three parts. The three parts are a non-modulation period part for 56.64 μs, a part including twenty-four pulses at $f_c/32$ (=423.75 kHz) for 56.64 μs subsequent to the non-modulation period part, and a part of Logic 1 shown in FIG. 2B for 37.76 μs. A length of the SOF pattern corresponds to a length of four data bits shown in FIG. 2A or 2B.

Figure 4B:
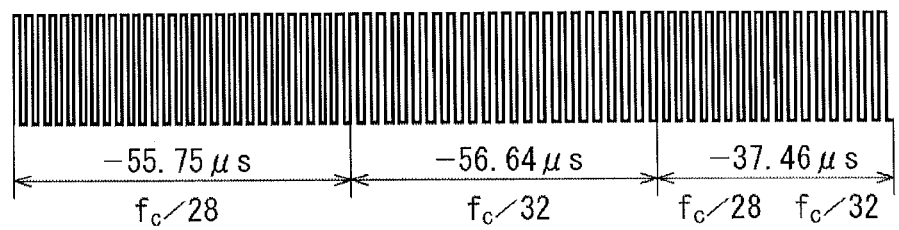

An SOF in the case where two subcarriers are used is coded (is modulated) as shown in FIG. 4B. A pattern of the SOF in the case where two subcarriers are used shown in FIG. 4B has three parts. The three parts are a part at $f_c/28$ (=484.28 kHz) for 55.75 μs, a part including twenty-four pulses at $f_c/32$ (=423.75 kHz) for 56.64 μs subsequent to the part at $f_c/28$, and a part of Logic 1 shown in FIG. 3B for 37.46 μs. A length of the SOF pattern corresponds to a length of about four data bits shown in FIG. 3A or 3B.

By detecting these SOFs, a bit information sequence after the SOFs is allowed to be detected for the first time. Therefore, it may be important for the reader 11 (shown in FIG. 1) to detect the SOF at a highly-accurate timing. Also, it is necessary to detect two patterns of SOF, that are, the SOF in "One Subcarrier" mode and the SOF in "Two Subcarriers" mode.

Description will be given of a demodulation section capable of detecting two SOF patterns and of detecting the SOF patterns at a highly-accurate timing.

[Configuration and Processing of Demodulation Section in First Embodiment]

Figure 5:
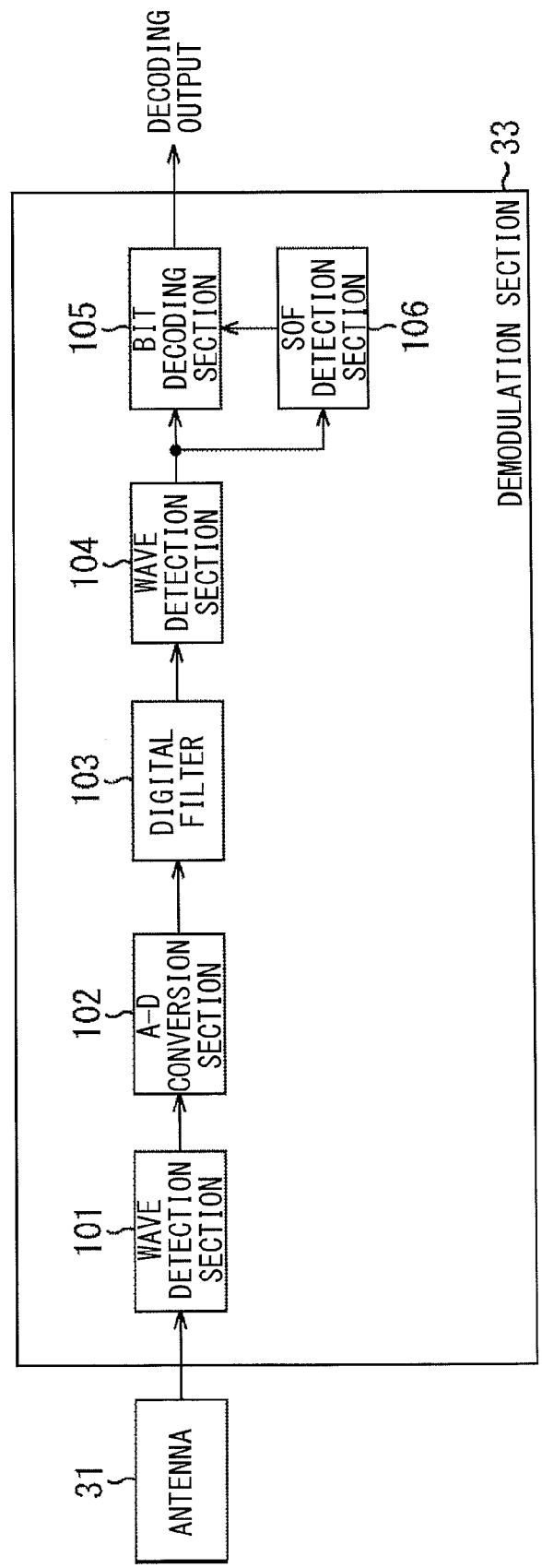
FIG. 5 is a diagram illustrating a configuration of an example of a demodulation section in an embodiment of the present technology.

FIG. 5 is a diagram illustrating a configuration of the demodulation section 33 in the reader 11 in the first embodiment. The demodulation section 33 includes a wave detection section 101, an A-D (Analog-to-Digital) conversion section 102, a digital filter 103, a wave detection section 104, a bit decoding section 105, and an SOF detection section 106.

The wave detection section 101 detects, by synchronous detection or envelope detection, the RF signal received by the antenna 31, and outputs the detected signal to the A-D conversion section 102. The A-D conversion section 102 converts the inputted signal to a digital signal, and supplies the converted signal to the digital filter 103. The digital filter 103 removes or passes a signal having a predetermined frequency. The digital filter 103 may be configured, for example, of an FIR (Finite Impulse Response) digital filter, an IIR (Infinite Impulse Response) digital filter, or the like.

Description will be given here referring to an example of a case in which the digital filter 103 extracts only the subcarrier component at $f_c/32$ in this example. The digital filter 103 removes unnecessary frequency components other than the subcarrier component at $f_c/32$. Therefore, quality of the signal such as an S-N ratio is improved.

The output from the digital filter 103 is supplied to the wave detection section 104. The wave detection section 104 detects, by synchronous detection or envelope detection, the signal supplied from the digital filter 103, and outputs the detected signal to the bit decoding section 105 and to the SOF detection section 106.

The SOF detection section 106 determines whether or not the signal supplied from the wave detection section 104 is a signal representing an SOF. When the SOF detection section 106 detects the SOF, the bit decoding section 105 performs bit decoding on the signal supplied from the wave detection section 104 with the use of the timing of the detected SOF as a reference.

Figure 6:
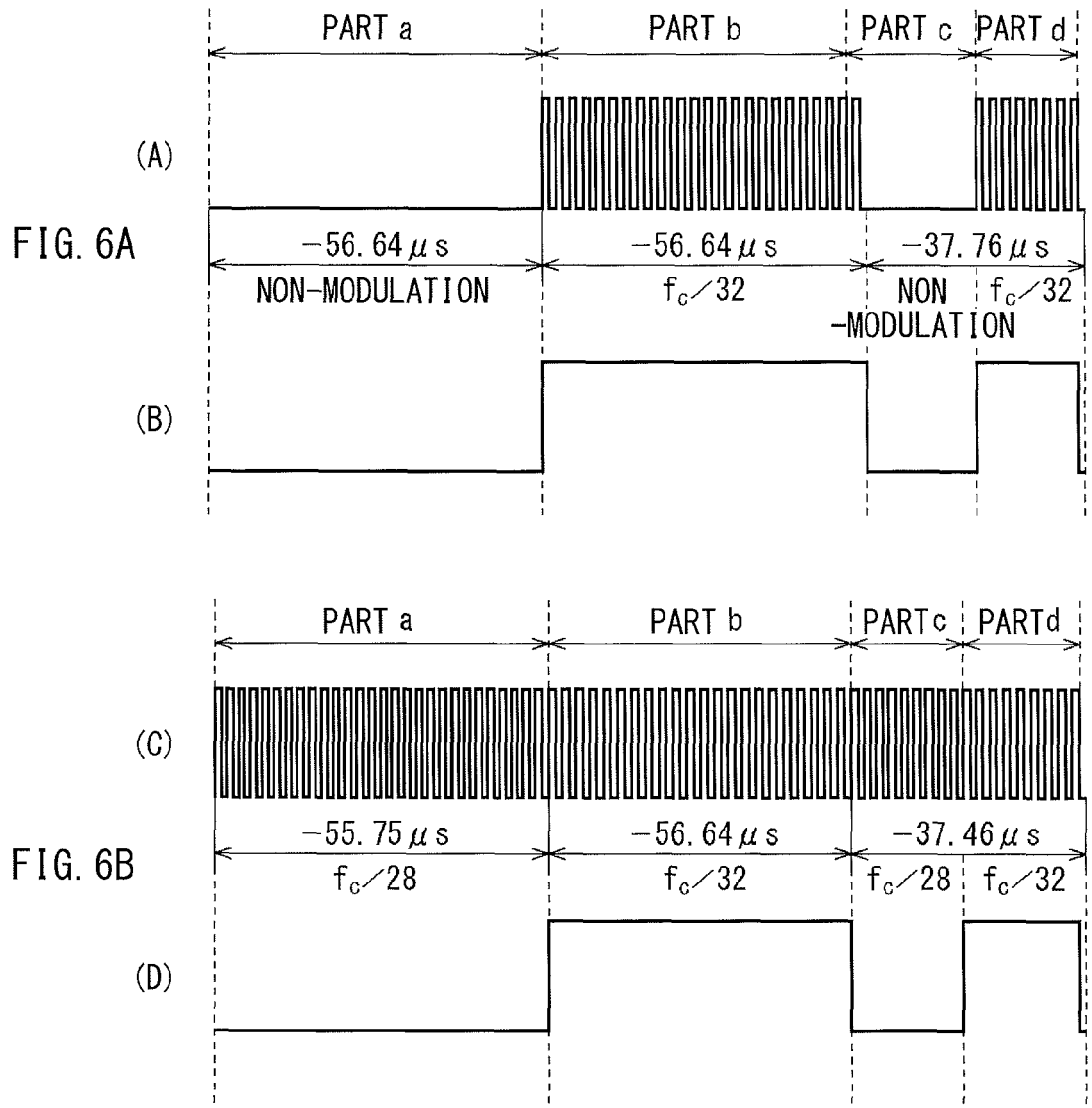
FIGS. 6A and 6B are diagrams for explaining about detection of an SOF.

Description will be given below of detection of the SOF by the SOF detection section 106 referring to FIGS. 6A and 6B. Part (A) of FIG. 6A illustrates a waveform of the SOF in "One Subcarrier" mode that is inputted to the demodulation section 33. Part (B) of FIG. 6A illustrates a waveform of a signal that is supplied from the wave detection section 104 to the SOF detection section 106. The waveform shown in Part (A) of FIG. 6A is the waveform shown in FIG. 4A, which has been already described above. However, the waveform will be described below again by dividing the waveform into four parts that are parts "a", "b", "c", and "d".

The SOF in "One Subcarrier" mode includes a part "a" that is a non-modulation period part for 56.64 μs, a part "b" including twenty-four pulses at $f_c/32$ (=423.75 kHz) for 56.64 μs subsequent to the part "a", and a part of Logic 1 in "One Subcarrier" mode shown in FIG. 2B for 37.76 μs. The Logic 1 part is configured of a non-modulation period part "c" for $256/f_c$ (18.88 μs) and a part "d" including eight pulses in series at $f_c/32$ (=423.75 kHz) for 18.88 μs.

The digital filter 103 is a filter that extracts only the subcarrier component at $f_c/32$. Therefore, when the signal of an SOF as shown in Part (A) of FIG. 6A is targeted for the processing by the digital filter 103, the component at $f_c/32$ is extracted. Therefore, the part b and the part d are extracted. In other words, the signal that has amplitude in the part b and in the part d as shown in Part (B) of FIG. 6A is supplied from the wave detection section 104 to the SOF detection section 106.

The waveform shown in Part (B) of FIG. 6A represents a signal that has amplitude (has a value determined as 1) in the part b and in the part d as with the waveform shown in Part (A) of FIG. 6A. When such a signal is supplied to the SOF detection section 106, the SOF detection section 106 determines that the SOF is detected, and instructs a timing of decoding to the bit decoding section 105.

The part a is a non-modulation part, and does not have amplitude. Therefore, actually, it is difficult to detect a start point of the part a. Detection is possible from a start point of the part b, that is, an end point of the part a. The SOF detection section 106 determines whether or not the signal supplied from the wave detection section 104 includes the part b and the part c, and thereby, determines whether or not the SOF is detected.

The part b is allowed to be detected by determining whether or not a signal is continuously detected for 56.64 μs. Also, the part c is allowed to be detected by detecting a part with no signal for 18.88 μs between an end point of the part b and a start point of the part d. In other words, when no signal for 18.88 μs is detected after the signal for 56.64 μs in the signal supplied from the wave detection section 104, the SOF detection section 106 determines that the SOF is detected. When the SOF detection section 106 determines that the SOF is detected, the bit decoding section 105 sets an end timing of the SOF as a reference of a timing to be used in processes thereafter.

It is to be noted that a noise or the like may be imposed on the signal to be received, and therefore, a signal part for 56.64 μs or a no-signal part for 18.88 μs may not be always detected. Therefore, a time tolerance with respect to 56.64 μs, for example, a predetermined time tolerance centering 56.64 μs may be set, and when a signal part within the predetermined time tolerance is detected, it may be determined that the part b is detected. Similarly, a time tolerance with respect to 18.88 μs, for example, a predetermined time tolerance centering 18.88 μs may be set, and when a no-signal part within the predetermined time tolerance is detected, it may be determined that the part c is detected.

In such a case, the SOF detection section 106 may determine that the SOF is detected when a modulation part within a first time tolerance and a non-modulation part within a second time tolerance subsequent to the modulation part are detected in the signal supplied from the wave detection section 104. By setting a range for an error with respect to the time period of the signal to be detected, and by allowing the SOF detection section 106 to determine that the SOF is detected when the time period of the detected signal is within the range for an error, the SOF in "Two Subcarriers" mode which will be described below is also allowed to be detected.

It is to be noted that only one of the first time tolerance and the second time tolerance may be set. Further, a third time tolerance in which the first time tolerance is added to the second time tolerance may be set, and it may be determined that the SOF is detected when a total period of the modulation part and the non-modulation part is within the third time tolerance.

It is to be noted that the time period of 56.64 μs of the above-described part b is a length corresponding to 1.5 bits, and the time period of 18.88 μs of the part c is a length corresponding to 0.5 bits. Therefore, the SOF detection section 106 may determine that the SOF is detected when a signal is continuously detected for a time period within a first time period that corresponds to an amount of bits having a predetermined tolerance centering 1.5 bits, and subsequently, no signal is detected for a time period within a second tolerance that corresponds to an amount of bits having a predetermined width centering 0.5 bits, in the signal supplied from the wave detection section 104.

Part (C) of FIG. 6B illustrates a waveform of the SOF in "Two Subcarriers" mode that is inputted to the demodulation section 33, and Part (D) of FIG. 6B illustrates a waveform of a signal that is supplied from the wave detection section 104 to the SOF detection section 106. The waveform shown in Part (C) of FIG. 6B is the waveform shown in FIG. 4B, which has been already described above. However, the waveform will be described below again by dividing the waveform into four parts that are parts "a", "b", "c", and "d".

The SOF in "Two Subcarriers" mode includes a part "a" at $f_c/28$ (=484.28 kHz) for 55.75 µs, a part "b" including twenty-four pulses at $f_c/32$ (=423.75 kHz) for 56.64 µs subsequent to the part a, and a part of Logic 1 in "Two Subcarriers" mode shown in FIG. 3B for 37.46 µs. The Logic 1 part is configured of a part "c" including nine pulses at $f_c/28$ (=484.28 kHz) for 18.58 µs and a part "d" including eight pulses at $f_c/32$ (=423.75 kHz) for 18.88 µs.

The digital filter 103 is a filter that extracts only the subcarrier component at $f_c/32$. Therefore, when the signal of SOF as shown in Part (C) of FIG. 6B is targeted for the processing by the digital filter 103, the component at $f_c/32$ is extracted. Therefore, the part b and the part d are extracted. In other words, the signal that has amplitude in the part b and in the part d as shown in Part (D) of FIG. 6B is supplied from the wave detection section 104 to the SOF detection section 106.

The waveform shown in Part (D) of FIG. 6B represents a signal that has amplitude in the part b and in the part d as with the waveforms shown in Parts (A) and (B) of FIG. 6A. When such a signal is supplied to the SOF detection section 106, the SOF detection section 106 determines that the SOF is detected, and instructs a timing of decoding to the bit decoding section 105.

Also for the SOF in "Two Subcarriers" mode, the part a in the signal supplied to the SOF detection section 106 does not have amplitude. Therefore, actually, it is difficult to detect a start point of the part a. Detection is possible from a start point of the part b, that is, an end point of the part a. The SOF detection section 106 determines whether or not the signal supplied from the wave detection section 104 includes the part b and the part c, and thereby, determines whether or not the SOF is detected.

Also for the SOF in "Two Subcarriers" mode, the part b is allowed to be detected by determining whether or not a signal is continuously detected for 56.64 µs as for the SOF in "One Subcarrier" mode. Also, the part c is allowed to be detected by detecting a part with no signal for 18.58 µs between an end point of the part b and a start point of the part d. In other words, when no signal for 18.58 µs is detected after the signal for 56.64 µs in the signal supplied from the wave detection section 104, the SOF detection section 106 determines that the SOF is detected.

It is to be noted that a noise or the like may be imposed on the signal to be received, and therefore, a signal part for 56.64 µs or a no-signal part for 18.58 µs is not always detected. Also, the no-signal part for 18.58 µs is shorter in time than the no-signal part for 18.88 µs of the part c in the SOF in "One Subcarrier" mode. In consideration of such matters, a time tolerance including 56.64 µs, for example, a predetermined time tolerance centering 56.64 µs may be set, and when a signal part (a signal part having a value determined as 1) within the predetermined time tolerance is detected, it may be determined that the part b is detected. Similarly, a time tolerance including 18.58 µs and 18.88 µs, for example, a predetermined time tolerance centering one of 18.58 µs and 18.88 µs and including the both time periods may be set, and when a no-signal part (a signal part having a value determined as 0) within the predetermined time tolerance is detected, it may be determined that the part c is detected.

In such a case, the SOF detection section 106 may determine that the SOF is detected when a modulation part within the first time tolerance and a non-modulation part within the second time tolerance subsequent to the modulation part are detected in the signal supplied from the wave detection section 104. It is to be noted that the first time tolerance, the second time tolerance, etc. may use bit lengths as references as in the above-described case.

Also, in such a manner, both the SOF received in "One Subcarrier" mode and the SOF received in "Two Subcarriers" mode are allowed to be detected, and the SOFs corresponding to the signals in the both modes are allowed to be detected without being influenced by a small difference in the length between the SOF in "One Subcarrier" mode and the SOF in "Two Subcarriers" mode.

By using the filter that extracts the subcarrier component at $f_c/32$ in such a manner, each of the SOF in "One Subcarrier" mode and the SOF in "Two Subcarriers" mode is allowed to be detected. Since the SOF is detected in such a simple configuration, different SOFs are allowed to be detected without increasing the circuit size. Also, the processing is allowed to be reduced, and therefore, reduction in power consumption is achieved.

[Configuration and Processing of Demodulation Section in Second Embodiment]

Figure 7:
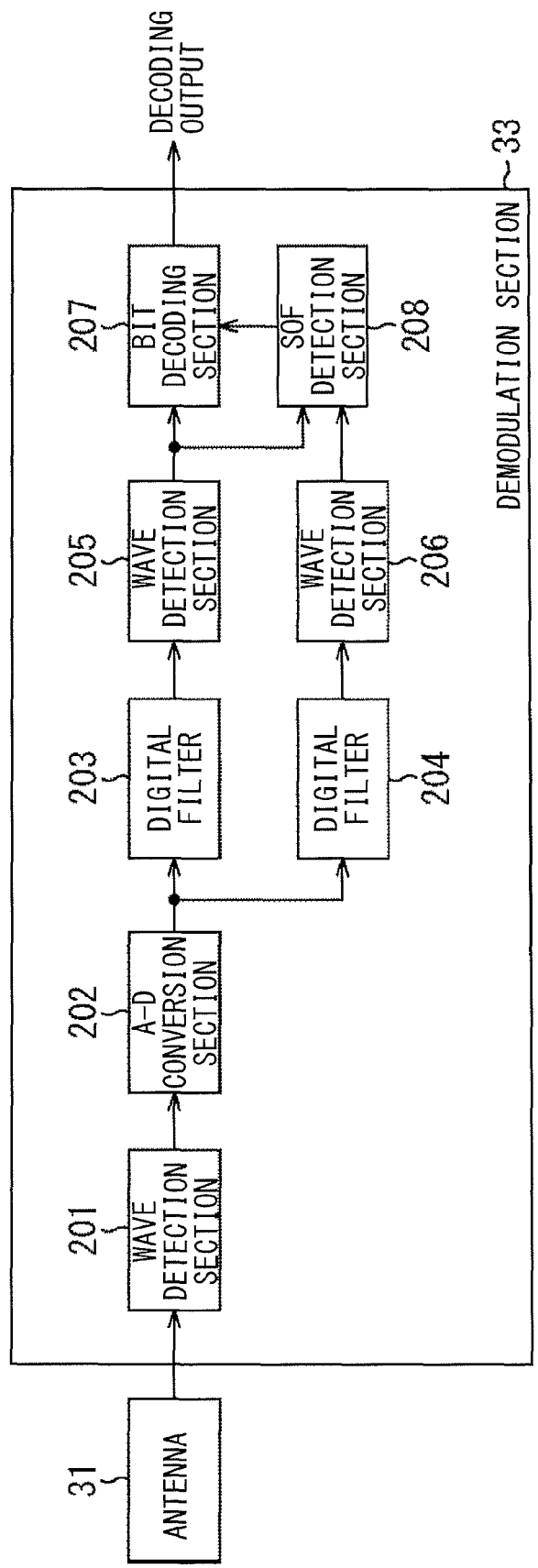
FIG. 7 is a diagram illustrating a configuration of an example of a demodulation section in an embodiment of the present technology.

FIG. 7 is a diagram illustrating a configuration of a demodulation section 33 in the second embodiment. The demodulation section 33 includes a wave detection section 201, an A-D (Analog-to-Digital) conversion section 202, a digital filter 203, a digital filter 204, a wave detection section 205, a wave detection section 206, a bit decoding section 207, and an SOF detection section 208.

The demodulation section 33 shown in FIG. 7 is different from the demodulation section 33 shown in FIG. 5 in that the demodulation section 33 shown in FIG. 7 includes two digital filters and two wave detection sections that process signals supplied from the respective digital filters. The processing performed by each section in the demodulation section 33 shown in FIG. 7 is similar to the processing performed by each section in the demodulation section 33 shown in FIG. 5, and therefore, description thereof will be omitted as appropriate.

The two digital filters, that are, the digital filter 203 and the digital filter 204 each receive a signal supplied from the A-D conversion section 202. The digital filter 203 and the digital filter 204 are filters that extract signals having carrier components different from each other. In this example, description will be given referring, as an example, to a case where the digital filter 203 extracts a subcarrier component at $f_c/32$, and the digital filter 204 extracts a subcarrier component at $f_c/28$.

The digital filter 203 removes unnecessary frequency components other than the subcarrier component at $f_c/32$. Therefore, quality of the signal such as an S-N ratio is improved. Similarly, the digital filter 204 removes unnecessary frequency components other than the subcarrier component at $f_c/28$. Therefore, quality of the signal such as an S-N ratio is improved.

The output from the digital filter 203 is supplied to the wave detection section 205, and the output from the digital filter 204 is supplied to the wave detection section 206. The wave detection section 205 detects, by synchronous detection or envelope detection, the signal supplied from the digital filter 203, and outputs the detected signal to the bit decoding section 207 and to the SOF detection section 208. Similarly, the wave detection section 206 detects, by synchronous detection or envelope detection, the signal supplied from the digital filter 204, and outputs the detected signal to the bit decoding section 207 and to the SOF detection section 208.

The SOF detection section 208 uses the signals supplied from the wave detection sections 205 and 206 to determine whether or not the signals are each a signal representing an SOF. Description will be given later referring to FIGS. 8 and 9 about this determination. When the SOF detection section 208 detects the SOF, the bit decoding section 207 performs bit decoding on the signal supplied from the wave detection section 205 with the use of the timing of the detected SOF as a reference.

Figure 8:
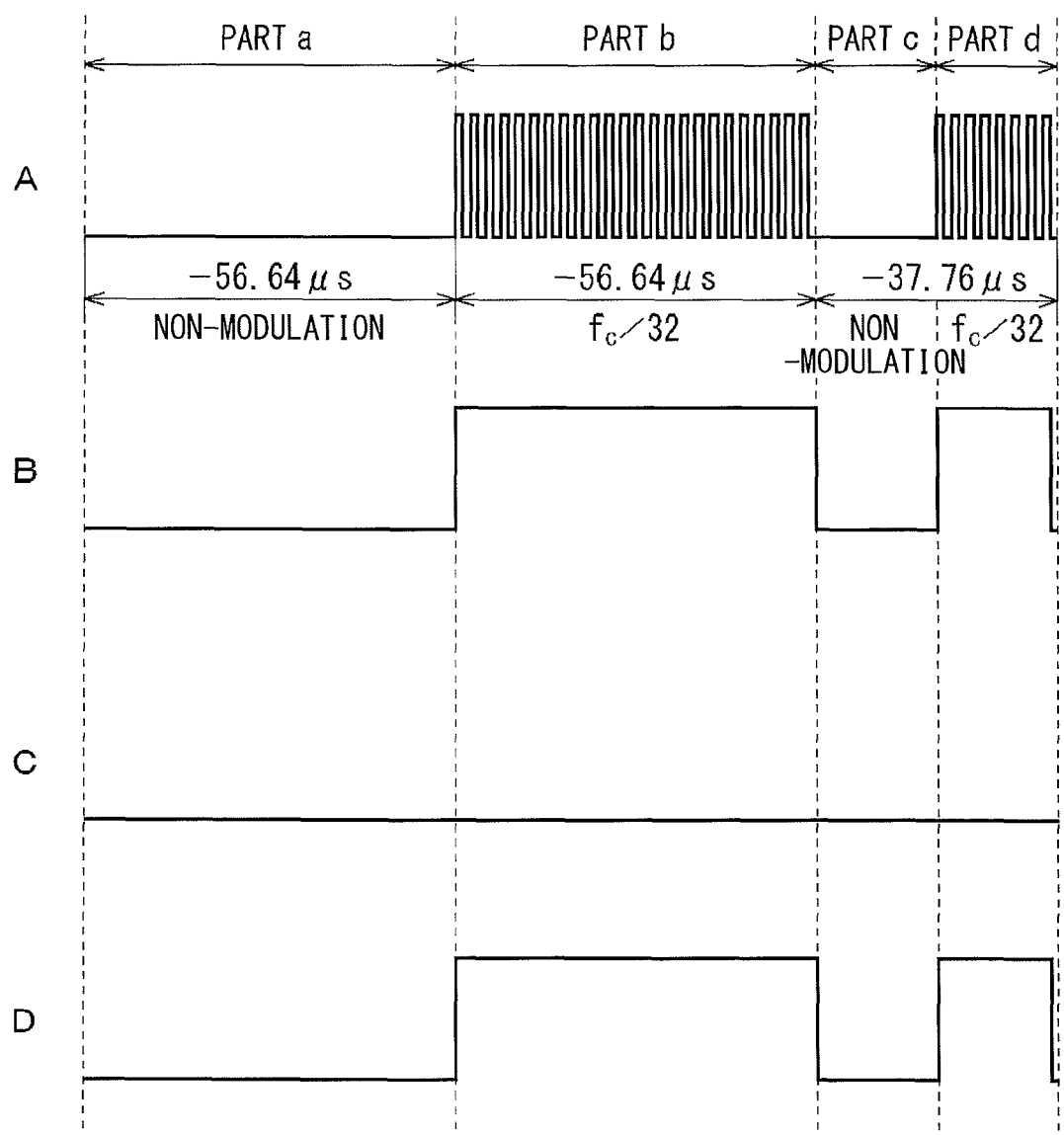
FIG. 8 is a diagram for explaining about detection of an SOF.

Description will be given below of detection of the SOF by the SOF detection section 208 referring to FIG. 8. Part (A) of FIG. 8 illustrates a waveform of the SOF in "One Subcarrier" mode that is inputted to the demodulation section 33. Part (B) of FIG. 8 illustrates a waveform of a signal that is supplied from the wave detection section 205 to the SOF detection section 208. Part (C) of FIG. 8 illustrates a waveform of a signal that is supplied from the wave detection section 206 to the SOF detection section 208. Part (D) of FIG. 8 illustrates a waveform of a signal that is generated as a result of calculation of a difference between the two supplied signals performed by the SOF detection section 208.

The waveform shown in Part (A) in FIG. 8 represents an SOF in "One Subcarrier" mode as with the waveform shown in Part (A) of FIG. 6A, and is divided into four parts that are parts "a", "b", "c", and "d" for description.

The SOF in "One Subcarrier" mode includes a part "a" that is a non-modulation period part for 56.56 μs, a part "b" including twenty-four pulses at $f_c/32$ (=423.75 kHz) for 56.64 μs, a part "c" that is a non-modulation period part for 18.88 μs, and a part "d" including eight pulses at $f_c/32$ (=423.75 kHz) for 18.88 μs.

As in the case described referring to Parts (A) and (B) of FIG. 6A, the digital filter 203 is a filter that extracts only the subcarrier component at $f_c/32$. Therefore, when the signal of an SOF as shown in Part (A) of FIG. 8 is targeted for the processing, the part b and the part d are extracted. In other words, the signal that has amplitude in the part b and in the part d as shown in Part (B) of FIG. 8 is supplied from the wave detection section 205 to the SOF detection section 208.

The digital filter 204 is a filter that extracts only the subcarrier component at $f_c/28$. Therefore, when the signal of an SOF as shown in Part (A) of FIG. 8 is targeted for the processing by the digital filter 204, none of the parts a to d is extracted since the component at $f_c/28$ is not included. In other words, no signal as shown in Part (C) of FIG. 8 is supplied from the wave detection section 206 to the SOF detection section 208.

The SOF detection section 208 receives a signal as shown in Part (B) of FIG. 8 from the wave detection section 205, and receives a signal as shown in Part (C) of FIG. 8 from the wave detection section 206. The SOF detection section 208 calculates a difference between the two supplied signals, and generates a new signal. When a difference between the signal shown in Part (B) of FIG. 8 and the signal shown in Part (C) of FIG. 8 is calculated (when the signal shown in Part (C) of FIG. 8 is subtracted from the signal shown in Part (B) of FIG. 8), the signal component shown in Part (B) of FIG. 8 remains. Therefore, a signal same as the signal shown in Part (B) of FIG. 8 is generated. In other words, the SOF detection section 208 obtains a signal as shown in Part (D) of FIG. 8.

The waveform shown in Part (D) of FIG. 8 represents a signal that has amplitude (has a value determined as 1) in the part b and in the part d as with the waveform shown in Part (A) of FIG. 8. When such a signal is supplied to the SOF detection section 208, the SOF detection section 208 determines that the SOF is detected, and instructs a timing of decoding to the bit decoding section 207.

As described above referring to FIGS. 6A and 6B, the part a is a non-modulation part, and does not have amplitude. Therefore, actually, it is difficult to detect a start point of the part a. Detection is possible from a start point of the part b, that is, an end point of the part a. The SOF detection section 208 determines whether or not the signal supplied from the wave detection section 205 includes the part b and the part c, and thereby, determines whether or not the SOF is detected.

In such a manner, also when the two digital filters and the two wave detection sections are used, the SOF detection section 208 may, for example, set a time tolerance including 56.64 μs, and may determine that the part b is detected when a signal part within the predetermined time tolerance is detected. Similarly, the SOF detection section 208 may, for example, set a time tolerance including 18.88 μs, and may determine that the part c is detected when a no-signal part within the predetermined time tolerance is detected.

In such a case, the SOF detection section 208 may determine that the SOF is detected when a modulation part within the first time tolerance and a non-modulation part within the second time tolerance subsequent to the modulation part are detected in the signal generated from the signals supplied from the wave detection sections 205 and 206. It is to be noted that the first time period (the first time tolerance), the second time period (the second time tolerance), etc. may use bit lengths as references as in the above-described case.

Figure 9:
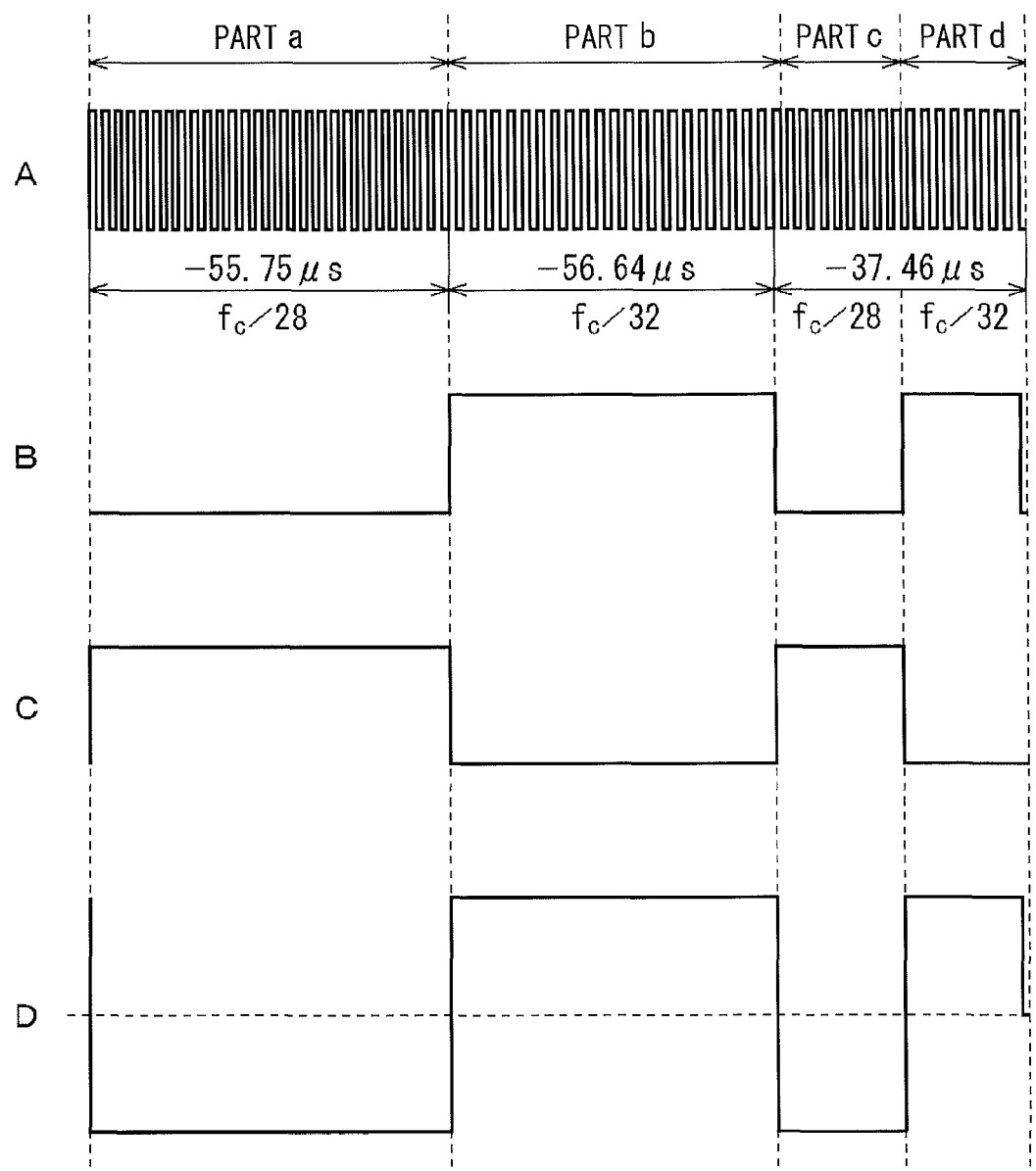
FIG. 9 is a diagram for explaining about detection of an SOF.

Part (A) of FIG. 9 illustrates a waveform of the SOF in "Two Subcarriers" mode that is inputted to the demodulation section 33. Part (B) of FIG. 9 illustrates a waveform of a signal that is supplied from the wave detection section 205 to the SOF detection section 208. Part (C) of FIG. 9 illustrates a waveform of a signal that is supplied from the wave detection section 206 to the SOF detection section 208. Part (D) of FIG. 9 illustrates a waveform of a signal that is generated as a result of calculation of a difference between the two supplied signals performed by the SOF detection section 208.

The waveform shown in Part (A) in FIG. 9 represents an SOF in "Two Subcarriers" mode as with the waveform shown in Part (C) of FIG. 6B, and is divided into four parts that are parts "a", "b", "c", and "d" for description.

The SOF in "Two Subcarriers" mode includes a part "a" at $f_c/28$ (=484.28 kHz) for 55.75 μs, a part "b" including twenty-four pulses at $f_c/32$ (=423.75 kHz) for 56.64 μs, a part "c" including nine pulses at $f_c/28$ (=484.28 kHz) for 18.58 μs, and a part "d" including eight pulses at $f_c/32$ (=423.75 kHz) for 18.88 μs.

As in the case described referring to Parts (C) and (D) of FIG. 6B, the wave detection section 205 is a filter that extracts only the subcarrier component at $f_c/32$. Therefore, when the signal of an SOF as shown in Part (A) of FIG. 9 is targeted for the processing, the part b and the part d are extracted. In other words, the signal that has amplitude in the part b and in the part d as shown in Part (B) of FIG. 9 is supplied from the wave detection section 205 to the SOF detection section 208.

The digital filter 204 is a filter that extracts only the subcarrier component at $f_c/28$. Therefore, when the signal of an SOF as shown in Part (A) of FIG. 9 is targeted for the processing by the digital filter 204, the component at $f_c/28$ is extracted, and therefore, the part a and the part c are extracted. In other words, the signal that has amplitude in the part a and in the part c as shown in Part (C) of FIG. 9 is supplied from the wave detection section 206 to the SOF detection section 208.

The SOF detection section 208 receives a signal as shown in Part (B) of FIG. 9 from the wave detection section 205, and receives a signal as shown in Part (C) of FIG. 9 from the wave detection section 206. The SOF detection section 208 calculates a difference between the two supplied signals, and generates a new signal. When a difference between the signal shown in Part (B) of FIG. 9 and the signal shown in Part (C) of FIG. 9 is calculated (when the signal shown in Part (C) of FIG. 9 is subtracted from the signal shown in Part (B) of FIG. 9), the part a and the part c each becomes a signal that has amplitude of a negative value, and the part b and the part d each becomes a signal that has amplitude of a positive value. In other words, the SOF detection section 208 obtains a signal as shown in Part (D) of FIG. 9.

When whether or not the SOF is detected is determined based on the signal as shown in Part (D) of FIG. 9, the SOF in "Two Subcarriers" mode is detected as in a manner similar to that of the detection of the SOF in "One Subcarrier" mode described referring to FIG. 8, for example, by determining whether or not the signal includes the part b and the part c. In this case, it may be determined that the SOF is detected, for example, when the modulated signal is detected continuously for a time period within the first time tolerance (detection of the part b), and then, no-signal (part of "0") is detected for a time period within the second time tolerance (detection of the part c), where the negative amplitude is considered as "0".

It is to be noted that, when the signal as shown in Part (D) of FIG. 9 is obtained, one or both of the SOF detection section 208 and the bit decoding section 207 to which the signal from the SOF detection section 208 is supplied set a one-bit signal with the use of the maximum value and the minimum value of the obtained signal. In other words, an average value of the maximum value and the minimum value is used as a border. For example, a value equal to or smaller than the average value may be considered as "0", and a value equal to or larger than the average value may be considered as "1".

In such a case, the average value of the maximum value and the minimum value of the signal shown in Part (D) of FIG. 9 becomes 0, the signals of parts illustrated as negative values in the part a and the part c are considered as the signals having a value of 0, and the signals of parts illustrated as positive values in the part b and the part d are considered as the signals having a value of 1. Therefore, when it is detected that the part having a value of 1 has continued for a time period within the first time tolerance, and then, the part having a value of 0 has continued for a time period within the second time tolerance, it is determined that the SOF is detected and the processing is performed.

In such a case, the SOF detection section 208 may generate a signal as shown in Part (D) of FIG. 9, may detect the time period of a part having a value of 1 or 0, may detect an SOF from the detection result, and may instruct a timing of decoding to the bit decoding section 207 when the SOF is detected. Alternatively, the SOF detection section 208 may generate a signal as shown in Part (D) of FIG. 9, and may supply the generated signal to the bit decoding section 207. Further, the bit decoding section 207 may detect the time period of a part having a value of 1 or 0, and may detect an SOF from the detection result.

Again, Part (D) of FIG. 8 is referred to. Part (D) of FIG. 8 illustrates a signal that is generated by the SOF detection section 208 when the SOF in "One Subcarrier" mode is received. In the signal shown in Part (D) of FIG. 8, the part a and the part c are signal parts that have a value of 0, and the part b and the part d are signal parts that have a value of 1. The detection of an SOF is allowed to be performed by determining whether or not it is detected that a part (the part b) having a value of 1 lasts for a time period within the first time tolerance, and then, a part (the part c) having a value of 0 lasts for a time period within the second time tolerance. According to such detection, it is possible to detect the SOF in "One Subcarrier" mode and the SOF in "Two Subcarriers" mode by the same detection method with the use of a signal obtained from a difference between the signals supplied from the two digital filters (the two wave detection sections).

Also in this case, the first time tolerance and the second time tolerance may be a time period having a predetermined time tolerance including 56.64 μs and a time period having a predetermined time tolerance including 18.88 μs, respectively.

By adopting the above-described manner, it is possible to detect both the SOF received in "One Subcarrier" mode and the SOF received in "Two Subcarriers" mode, and to detect the SOFs corresponding to the signals in the both modes.

The SOF is allowed to be detected by such a simple configuration, and therefore, different SOFs are allowed to be detected without increasing the circuit size. Also, the process is allowed to be reduced, and therefore, reduction in power consumption is achieved.

[Configuration and Processing of Demodulation Section in Third Embodiment]

Figure 10:
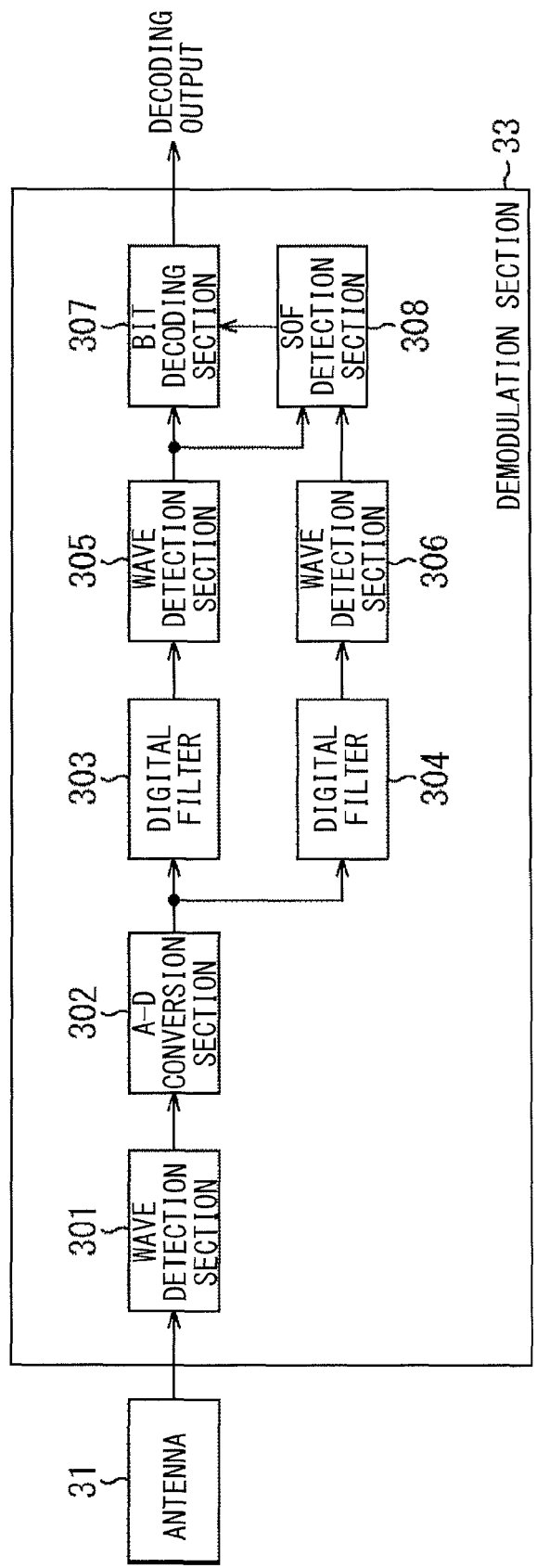
FIG. 10 is a diagram illustrating a configuration of an example of a demodulation section in an embodiment of the present technology.

FIG. 10 is a diagram illustrating a configuration of a demodulation section 33 in the third embodiment. The demodulation part 33 includes a wave detection section 301, an A-D (Analog-to-Digital) conversion section 302, a digital filter 303, a digital filter 304, a wave detection section 305, a wave detection section 306, a bit decoding section 307, and an SOF detection section 308.

The demodulation section 33 shown in FIG. 10 has a configuration similar to that of the demodulation section 33 shown in FIG. 7. Processing performed by each section in the demodulation section 33 shown in FIG. 10 in which a signal to be extracted by the digital filter is different from that in the demodulation section 33 shown in FIG. 7 is basically similar to the processing in each section in the demodulation section 33 shown in FIG. 7, and therefore, may not be further described as appropriate.

The two digital filters, that are, the digital filter 303 and the digital filter 304, each receive a signal supplied from the A-D conversion section 302. The digital filter 303 and the digital filter 304 are filters that extract signals having carrier components different from each other. In this example, description will be given referring, as an example, to a case where the digital filter 303 removes a subcarrier component at $f_c/32$ and extracts other components, and the digital filter 304 removes a subcarrier component at $f_c/28$ and extracts other components.

The digital filter 303 removes the subcarrier component at $f_c/32$. Therefore, transient response characteristics of the filter are improved. Similarly, the digital filter 304 removes the subcarrier component at $f_c/28$. Therefore, transient response characteristics of the filter are improved.

The output from the digital filter 303 is supplied to the wave detection section 305, and the output from the digital filter 304 is supplied to the wave detection section 306. The wave detection section 305 detects, by synchronous detection or envelope detection, the signal supplied from the digital filter 303, and outputs the detected signal to the bit decoding section 307 and to the SOF detection section 308. Similarly, the wave detection section 306 detects, by synchronous detection or envelope detection, the signal supplied from the digital filter 304, and outputs the detected signal to the bit decoding section 307 and to the SOF detection section 308.

The SOF detection section 308 uses the signals supplied from the wave detection sections 305 and 306 to determine whether or not the signals are each a signal representing an SOF. Description will be given later referring to FIGS. 11 and 12 about this determination. When the SOF detection section 308 detects the SOF, the bit decoding section 307 performs bit decoding on the signal supplied from the wave detection section 305 with the use of the timing of the detected SOF as a reference.

Figure 11:
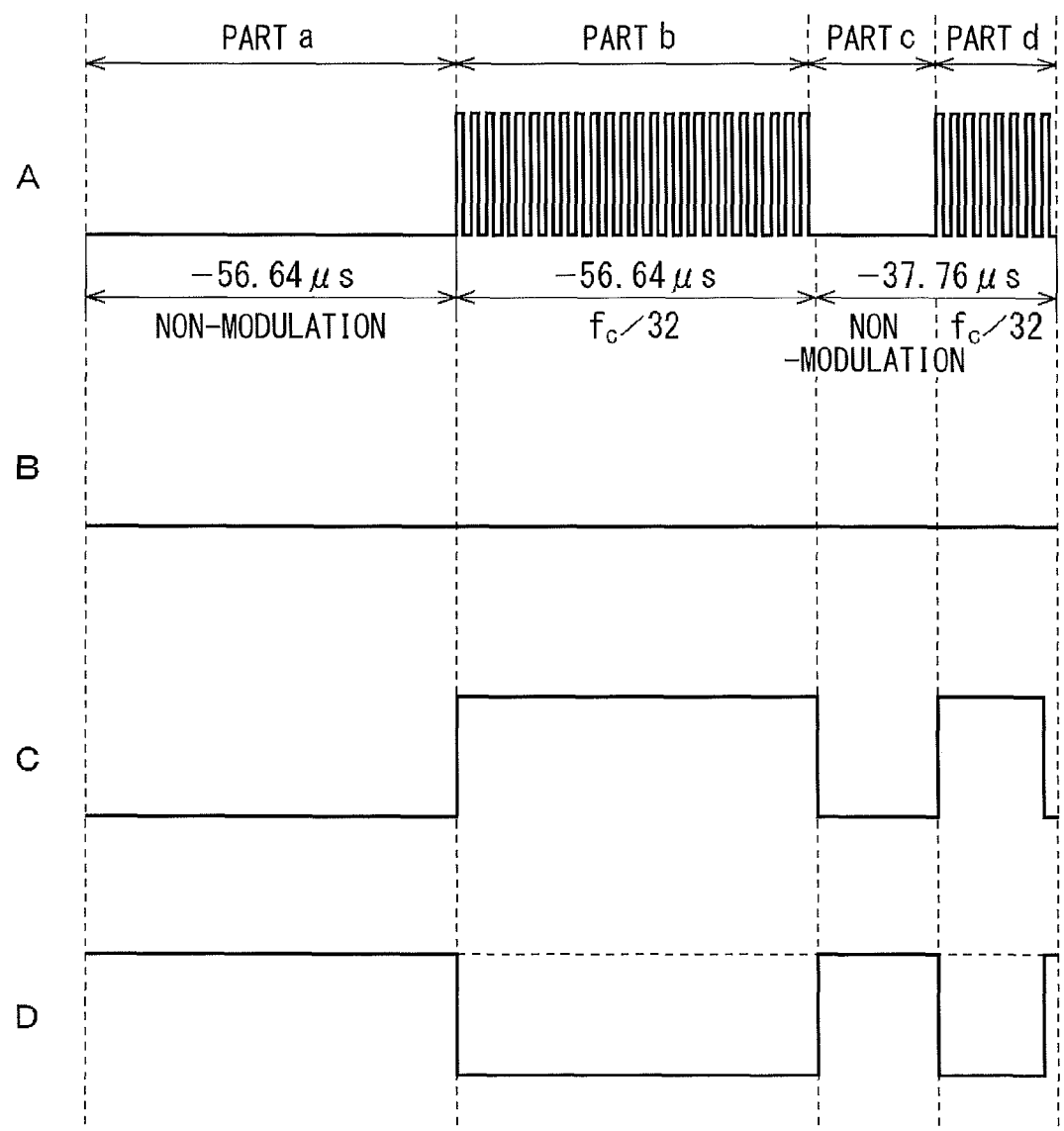
FIG. 11 is a diagram for explaining about detection of an SOF.

Description will be given below of detection of the SOF by the SOF detection section 308 referring to FIG. 11. Part (A) of FIG. 11 illustrates a waveform of the SOF in "One Subcarrier" mode that is inputted to the demodulation section 33. Part (B) of FIG. 11 illustrates a waveform of a signal that is supplied from the wave detection section 305 to the SOF detection section 308. Part (C) of FIG. 11 illustrates a waveform of a signal that is supplied from the wave detection section 306 to the SOF detection section 308. Part (D) of FIG. 11 illustrates a waveform of a signal that is generated as a result of calculation of a difference between the two supplied signals performed by the SOF detection section 308.

The waveform shown in Part (A) in FIG. 11 represents an SOF in "One Subcarrier" mode as with the waveform shown in Part (A) of FIG. 6A. The waveform includes a part "a" that is a non-modulation period part for 56.56 μs, a part "b" including twenty-four pulses at $f_c/32$ (=423.75 kHz) for 56.64 μs, a part "c" that is a non-modulation period part for 18.88 μs, and a part "d" including eight pulses at $f_c/32$ (=423.75 kHz) for 18.88 μs.

The digital filter 303 is a filter that removes the subcarrier component at $f_c/32$. Therefore, when the signal of an SOF as shown in Part (A) of FIG. 11 is targeted for the processing by the digital filter 303, none of the parts a to d is extracted since the targeted signal includes only the non-modulation part and the part having the component at $f_c/32$. In other words, no signal as shown in Part (B) of FIG. 11 is supplied from the wave detection section 305 to the SOF detection section 308.

The digital filter 304 is a filter that removes the subcarrier component at $f_c/28$. Therefore, when the signal of an SOF as shown in Part (A) of FIG. 11 is targeted for the processing, the part b and the part d are extracted. In other words, the signal that has amplitude in the part b and the part d as shown in Part (C) of FIG. 11 is supplied from the wave detection section 306 to the SOF detection section 308.

The SOF detection section 308 receives a signal as shown in Part (B) of FIG. 11 from the wave detection section 305, and receives a signal as shown in Part (C) of FIG. 11 from the wave detection section 306. The SOF detection section 308 calculates a difference between the two supplied signals, and generates a new signal. When a difference between the signal shown in Part (B) of FIG. 11 and the signal shown in Part (C) of FIG. 11 is calculated (when the signal shown in Part (C) of FIG. 11 is subtracted from the signal shown in Part (B) of FIG. 11), the signal component shown in Part (C) of FIG. 11 remains. In other words, the SOF detection section 308 obtains a signal as shown in Part (D) of FIG. 11.

The waveform shown in Part (D) of FIG. 11 has a shape same as that of the waveform shown in Part (A) of FIG. 11 although a value of amplitude is different therefrom, and represents a signal that has amplitude in the part b and in the part d. Although not illustrated, when the signal shown in Part (B) of FIG. 11 is subtracted from the signal shown in Part (C) of FIG. 11, the part a and the part c each become a non-signal part, and the part b and the part d each become a positive signal part. Such a signal is the same as the signal shown in Part (A) of FIG. 11. When such a signal is supplied to the SOF detection section 308, the SOF detection section 308 determines that the SOF is detected, and instructs a timing of decoding to the bit decoding section 307.

The SOF detection section 308 determines whether or not the signal supplied from the wave detection section 305 includes the part b and the part c, and thereby, determines whether or not the SOF is detected.

In such a manner, also when the two digital filters and the two wave detection sections are used, the SOF detection section 308 may, for example, set a time tolerance including 56.64 μs, and may determine that the part b is detected when a signal part within the predetermined time tolerance is detected. Similarly, the SOF detection section 308 may, for example, set a time tolerance including 18.88 μs, and may determine that the part c is detected when a no-signal part within the predetermined time tolerance is detected.

In such a case, the SOF detection section 308 may determine that the SOF is detected when a modulation part within the first time tolerance and a non-modulation part within the second time tolerance subsequent to the modulation part are detected in the signal generated from the signals supplied from the wave detection sections 305 and 306. It is to be noted that the first time tolerance, the second time tolerance, etc. may use the bit lengths as references as in the above-described case.

Figure 12:
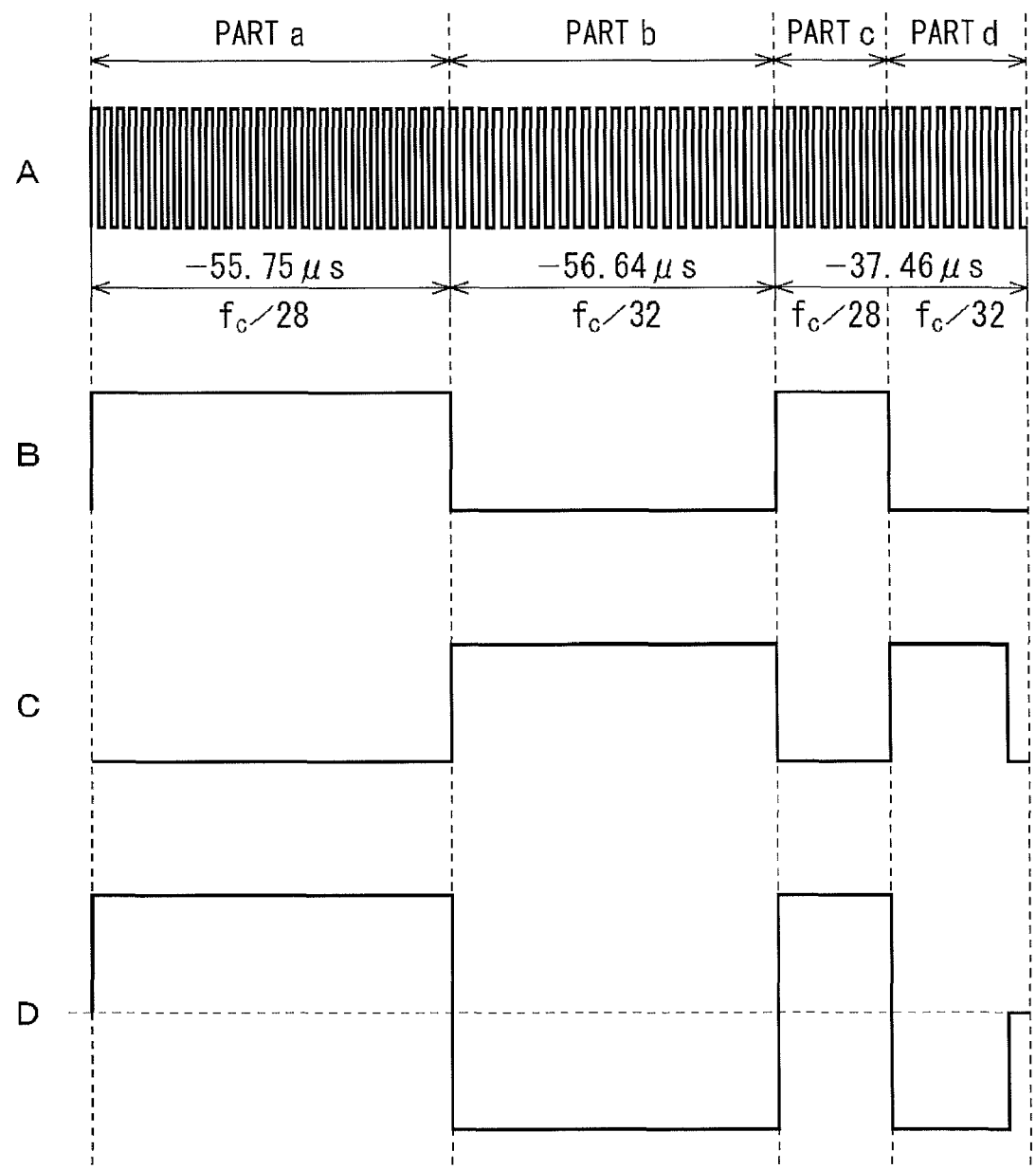
FIG. 12 is a diagram for explaining about detection of an SOF.

Part (A) of FIG. 12 illustrates a waveform of the SOF in "Two Subcarriers" mode that is inputted to the demodulation section 33. Part (B) of FIG. 12 illustrates a waveform of a signal that is supplied from the wave detection section 305 to the SOF detection section 308. Part (C) of FIG. 12 illustrates a waveform of a signal that is supplied from the wave detection section 306 to the SOF detection section 308. Part (D) of FIG. 12 illustrates a waveform of a signal that is generated as a result of calculation of a difference between the two supplied signals performed by the SOF detection section 308.

A waveform shown in Part (A) of FIG. 12 is an SOF in "Two Subcarriers" mode as with the waveform shown in Part (C) of FIG. 6B. The waveform includes a part "a" at $f_c/28$ (=484.28 kHz) for 55.75 μs, a part "b" including twenty-four pulses at $f_c/32$ (=423.75 kHz) for 56.64 μs, a part "c" including nine pulses at $f_c/28$ (=484.28 kHz) for 18.58 μs, and a part "d" including eight pulses at $f_c/32$ (=423.75 kHz) for 18.88 μs.

The digital filter 303 is a filter that removes the subcarrier component at $f_c/32$. Therefore, when the signal of an SOF as shown in Part (A) of FIG. 12 is targeted for the processing by the digital filter 303, the part a and the part c are detected since the component at $f_c/32$ is removed, and other component, that is, in this case, the subcarrier component at $f_c/28$ is extracted. In other words, the signal that has amplitude in the part a and the part c as shown in Part (B) of FIG. 12 is supplied from the digital filter 304 to the SOF detection section 308.

The digital filter 304 is a filter that removes the subcarrier component at $f_c/28$. Therefore, when the signal of an SOF as shown in Part (A) of FIG. 12 is targeted for the processing by the digital filter 304, the part a and the part c are detected since the component at $f_c/28$ is removed, and other component, that is, in this case, the subcarrier component at $f_c/32$ is extracted. In other words, the signal that has amplitude in the part b and the part d as shown in Part (C) of FIG. 12 is supplied from the wave detection section 306 to the SOF detection section 308.

The SOF detection section 308 receives a signal as shown in Part (B) of FIG. 12 from the wave detection section 305, and receives a signal as shown in Part (C) of FIG. 12 from the wave detection section 306. The SOF detection section 308 calculates a difference between the two supplied signals, and generates a new signal. When a difference between the signal shown in Part (B) of FIG. 12 and the signal shown in Part (C) of FIG. 12 is calculated (when the signal shown in Part (C) of FIG. 12 is subtracted from the signal shown in Part (B) of FIG. 12), the part b and the part d each become a signal that has amplitude of a negative value, and the part a and the part c each become a signal that has amplitude of a positive value. In other words, the SOF detection section 308 obtains a signal as shown in Part (D) of FIG. 12.

When whether or not the SOF is received is determined based on the signal as shown in Part (D) of FIG. 12, the SOF in "Two Subcarriers" mode is detected as in a manner similar to that of the detection of the SOF in "One Subcarrier" mode described referring to FIG. 11, for example, by determining whether or not the signal includes the part b and the part c. In this case, it may be determined that the SOF is detected, for example, when a signal is detected continuously for a first time period within the first time tolerance (detection of the part b), and then, no-signal (part of "0") is detected for a second time period within the second time tolerance (detection of the part c), where the negative amplitude is considered as "0".

Alternatively, it may be determined that the SOF is detected when positive amplitude (corresponding to the part a) lasts for the first time period and then negative amplitude (corresponding to the part b) lasts for the second time period. Alternatively, it may be determined that the SOF is detected when two parts in series, for example, the part b and the part c are detected.

It is to be noted that, when the signal as shown in Part (D) of FIG. 12 is obtained, one or both of the SOF detection section 308 and the bit decoding section 307 to which the signal from the SOF detection section 308 is supplied set a one-bit signal with the use of the maximum value and the minimum value of the obtained signal. In other words, an average value of the maximum value and the minimum value is used as a border. For example, a value equal to or smaller than the average value may be considered as "0", and a value equal to or larger than the average value may be considered as "1".

In such a case, the average value of the maximum value and the minimum value of the signal shown in Part (D) of FIG. 12 becomes 0, the signals of parts illustrated as positive values in the part a and the part c are considered as signals having a value of 1, and the signals of parts illustrated as negative values in the part b and the part d are considered as signals having a value of 0. Therefore, when it is detected that the part having a value of 0 has continued for a time period within the first time tolerance, and then, the part having a value of 1 has continued for a time period within the second time tolerance, it is determined that the SOF is detected and the processing is performed.

In such a case, the SOF detection section 308 may generate a signal as shown in Part (D) of FIG. 12, may detect the time period of a part having a value of 1 or 0, may detect an SOF from the detection result, and may instruct a timing of decoding to the bit decoding section 307 when the SOF is detected. Alternatively, the SOF detection section 308 may generate a signal as shown in Part (D) of FIG. 9, and may supply the generated signal to the bit decoding section 307. Further, the bit decoding section 307 may detect the time period of a part having a value of 1 or 0, and may detect an SOF from the detection result.

Again, Part (D) of FIG. 11 is referred to. Part (D) of FIG. 11 illustrates a signal that is generated by the SOF detection section 308 when the SOF in "One Subcarrier" mode is received. In the signal shown in Part (D) of FIG. 11, the part a and the part c are signal parts that have a value of 1, and the part b and the part d are signal parts that have a value of 0. The detection of an SOF is allowed to be performed by determining whether or not it is detected that a part (the part b) having a value of 0 lasts for a time period within the first time tolerance, and then, a part (the part c) having a value of 1 lasts for a time period within the second time tolerance. According to such detection, it is possible to detect the SOF in "One Subcarrier" mode and the SOF in "Two Subcarriers" mode by the same detection method with the use of a signal obtained from a difference between the signals supplied from the two digital filters (the two wave detection sections).

It is to be noted that, in this example, description has been given that the signal supplied from the wave detection section 306 is subtracted from the signal supplied from the wave detection section 305. However, the signal supplied from the wave detection section 305 may be subtracted from the signal supplied from the wave detection section 306. In this case, as described above, when the SOF in "One Subcarrier" mode is processed, the signal shown in Part (B) of FIG. 11 is subtracted from the signal shown in Part (C) of FIG. 11. The part a and the part c each become a non-signal part that is considered as a value of 0, and the part b and the part d each become a positive signal part that is considered as a value of 1. Such a signal becomes a signal same as the signal shown in Part (A) of FIG. 11. Therefore, the SOF is detected by detecting the part b that is considered as a value of 1 and the part c that is considered as a value of 0.

Further, when the SOF in "Two Subcarriers" mode is processed, the signal shown in Part (B) of FIG. 12 is subtracted from the signal shown in Part (C) of FIG. 12. The part a and the part c each become a non-signal section that is considered as a value of 0, and the part b and the part d each become a positive signal section that is considered as a value of 1. Such a signal becomes a signal considered the same as the signal shown in Part (A) of FIG. 11 (corresponding to the signal shown in Part (D) of FIG. 11, although not illustrated). In other words, the SOF is detected by detecting the part b that is considered as a value of 1 and the part c that is considered as a value of 0.

Also in such a case, the SOF in "One Subcarrier" mode and the SOF in "Two Subcarriers" mode are allowed to be detected by the same method.

Also in this case, the first time period and the second time period may be a time period that has a predetermined time tolerance including 56.64 µs and a time period that has a predetermined time tolerance including 18.88 µs, respectively.

By adopting the above-described manner, it is possible to detect both the SOF received in "One Subcarrier" mode and the SOF received in "Two Subcarriers" mode, and to detect the SOFs corresponding to the signals in the both modes.

The SOF is allowed to be detected by such a simple configuration, and therefore, different SOFs are allowed to be detected without increasing the circuit size. Also, the process is allowed to be reduced, and therefore, reduction in power consumption is achieved.

In the second and third embodiments, description has been given referring, as an example, to a case in which two digital filters are used, and each of the two digital filters is a filter that extracts or removes a predetermined subcarrier component. When the two digital filters are used, one digital filter may extract a predetermined subcarrier component, and the other digital filter may remove a predetermined subcarrier component.

In such a case, the signals of SOFs that are outputted from the respective two digital filters become the same signal. The SOF detection section may add the two supplied signals, and may determine that the SOF is detected when the generated signal includes a part having amplitude for a first time period and includes a non-signal part for a second time period subsequent thereto.

In such a manner, by using the above-described embodiments of the present technology, it is possible to detect different SOFs without increasing the circuit size. Also, the processing is allowed to be reduced, and therefore, reduction in power consumption is achieved.

It is to be noted that, in the present embodiment, description has been given referring, as an example, to detection of the SOF in "One Subcarrier" mode that uses only the subcarrier at $f_c/32$ (uses only one subcarrier) and the SOFs in "Two Subcarriers" mode at $f_c/32$ and $f_c/28$ (uses two subcarriers). However, application of the present technology is not limited to the detection of these two signals. The above-described embodiments of the present technology may be applied to the detection of the signals that use different subcarriers.

[Concerning Recording Medium]

The above-described series of processing may be executed by hardware, or may be executed by software. When the series of processing is executed by software, a program that configures the software is installed in a computer. Examples of such a computer may include a computer that is built in a dedicated hardware, and a computer that is capable of executing various functions by installing various programs such as a general personal computer.

Figure 13:
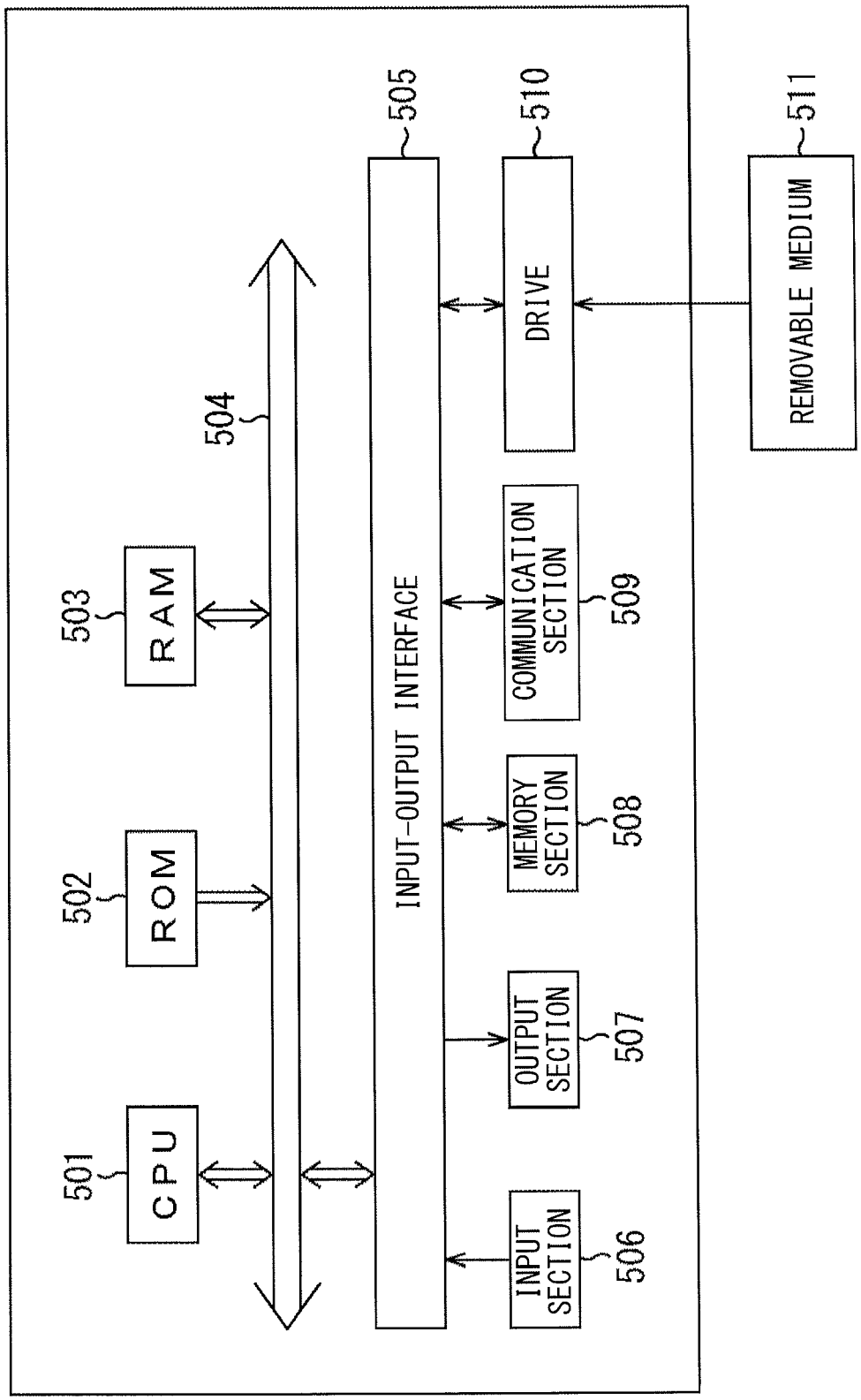
FIG. 13 is a diagram for explaining about a recording medium.

FIG. 13 is a block diagram illustrating a configuration example of hardware in a computer that executes the above-described series of processing with the use of a program. In the computer, a CPU (Central Processing Unit) 501, a ROM (Read Only Memory) 502, and a RAM (Random Access Memory) 503 are mutually connected by a bus 504. Further, the bus 504 is connected to an input-output interface 505. The input-output interface 505 is connected to an input section 506, an output section 507, a memory section 508, a communication section 509, and a drive 510.

The input section 506 includes a key board, a mouse, a microphone, etc. The output section 507 includes a display, a speaker, etc. The memory section 508 includes a hard disk, a non-volatile memory, etc. The communication section 509 includes a network interface etc. The drive 510 drives a removable medium 511 such as a magnetic disk, an optical disk, a magneto-optical disk, and a semiconductor memory.

In the computer configured as described above, for example, the CPU 501 may load a program stored in the memory section 508 to the RAM 503 via the input-output interface 505 and the bus 504 and may execute the program. Thus, the above-described series of processing is performed.

The program to be executed by the computer (the CPU 501) may be provided, for example, by storing the program in the removable medium 511 that serves as a package medium or the like. Alternatively, the program may be provided via wired or wireless transmission medium such as local area network, the Internet, and digital satellite broadcasting.

In the computer, the program is installed to the memory section 508 through the input-output interface 505 by attaching the removable medium 511 to the drive 510. Alternatively, the program may be installed to the memory section 508 by receiving the program by the communication section 509 via wired or wireless transmission medium. Alternatively, the program may be installed in advance to the ROM 502, the memory section 508, and/or the like.

It is to be noted that the program executed by the computer may be a program in which processing is performed in time series according to the order described in the present specification, or may be a program in which processing is performed in parallel or at necessary timings such as a timing when the processing is called.

In the present specification, "system" refers to whole of a unit that includes a plurality of devices.

It is to be noted that the embodiments of the present technology are not limited to the above-described embodiments, and may be variously modified within a range not departing from the gist of the present technology.

It is possible to achieve at least the following configurations from the above-described example embodiments and the modifications of the disclosure.

(1) A signal processing device including:
an extraction section configured to extract a signal having a predetermined component from an obtained signal; and
a detection section configured to determine a timing of decoding when a modulation part lasting for a first time period and a non-modulation part lasting for a second time period are detected from the signal extracted by the extraction section.

(2) The signal processing device according to (1), wherein the detection section detects an SOF (Start Of Frame) defined in International Standard ISO/IEC15693.

(3) The signal processing device according to (1) or (2), wherein the extraction section extracts a component at $f_c/32$ where $f_c$ is a frequency of a carrier magnetic field.

(4) The signal processing device according to (1) or (2), wherein
the extraction section includes a first extraction section and a second extraction section, the first extraction section being configured to extract a component at $f_c/32$, and the second extraction section being configured to extract a component at $f_c/28$, where $f_c$ is a frequency of a carrier magnetic field, and the detection section detects the modulation part lasting for the first time period and the non-modulation part lasting for the second time period from a signal configured of a difference between a signal supplied from the first extraction section and a signal supplied from the second extraction section.

(5) The signal processing device according to (1) or (2), wherein the extraction section includes a first extraction section and a second extraction section, the first extraction section being configured to extract a signal obtained by removing a component at $f_c/32$ from the obtained signal, and the second extraction section being configured to extract a signal obtained by removing a component at $f_c/28$ from the obtained signal, where $f_c$ is a frequency of a carrier magnetic field, and the detection section detects the modulation part lasting for the first time period and the non-modulation part lasting for the second time period from a signal configured of a difference between a signal supplied from the first extraction section and a signal supplied from the second extraction section.

(6) The signal processing device according to any one of (1) to (5), wherein a predetermined time tolerance is set for one or both of the first time period and the second time period, when the predetermined time tolerance is set for the first time period and the first time period is within the predetermined time tolerance, the detection section determines that the modulation part is detected, and when the predetermined time tolerance is set for the second time period and the second time period is within the predetermined time tolerance, the detection section determines that the non-modulation part is detected.

(7) A method of processing a signal, the method including:
   extracting a signal having a predetermined component from an obtained signal; and
   determining a timing of decoding when a modulation part lasting for a first time period and a non-modulation part lasting for a second time period are detected from the extracted signal.

(8) A recording medium storing a program readable by a computer executing processing, the processing including:
   extracting a signal having a predetermined component from an obtained signal; and
   determining a timing of decoding when a modulation part lasting for a first time period and a non-modulation part lasting for a second time period are detected from the extracted signal.

It should be understood by those skilled in the art that various modifications, combinations, sub-combinations, and alterations may occur depending on design requirements and other factors insofar as they are within the scope of the appended claims or the equivalents thereof.

What is claimed is:

1. A signal processing device, comprising:
   an extraction section that comprises a first extraction section configured to extract a first component from an obtained signal, and a second extraction section configured to extract a second component, different from the first component, from the obtained signal; and
   a detection section configured to:
      detect a modulation part that lasts for a first time period and a non-modulation part that lasts for a second time period from a signal configured of a difference between a first signal and a second signal, wherein the first signal is supplied from the first extraction section based on the extraction of the first component and the second signal is supplied from the second extraction section based on the extraction of the second component; and
      determine a time to decode based on the detection of the modulation part that lasts for the first time period and the non-modulation part that lasts for the second time period.

2. The signal processing device according to claim 1, wherein the detection section is further configured to detect a Start Of Frame (SOF) defined in International Standard ISO/IEC 15693.

3. The signal processing device according to claim 1, wherein the extraction section is further configured to extract a component at fc/32, where fc is a frequency of a carrier magnetic field.

4. The signal processing device according to claim 1, wherein the first extraction section is further configured to extract the first component at fc/32, and the second extraction section is further configured to extract the second component, different from the first component at fc/28, where fc is a frequency of a carrier magnetic field.

5. The signal processing device according to claim 1, wherein
   a first time tolerance or a second time tolerance is set for one or both of the first time period and the second time period,
   wherein the detection section is further configured to determine that the modulation part is detected based on the first time tolerance that is set for the first time period and based on a determination that the first time period is within the first time tolerance and
   the detection section is further configured to determine that the non-modulation part is detected based on the second time tolerance that is set for the second time period and based on a determination that the second time period is within the second time tolerance.

6. A method, comprising:
   extracting, by a processor, a first component from an obtained signal by a first extraction section and a second component, different from the first component, from the obtained signal by a second extraction section;
   detecting, by the processor, a modulation part lasting for a first time period and a non-modulation part lasting for a second time period from a signal configured of a difference between a first signal and a second signal, wherein the first signal is supplied from the first extraction section based on the extraction of the first component, and the second signal is supplied from the second extraction section based on the extraction of the second component; and
   determining a timing of decoding based on the detection of the modulation part lasting for the first time period and the non-modulation part lasting for the second time period.

7. A non-transitory computer-readable medium having stored thereon, computer-executable instructions which when executed by a processor, causes the processor to execute operations, the operations comprising:
   extracting a first component from an obtained signal by a first extraction section and a second component, different from the first component, from the obtained signal by a second extraction section;
   detecting a modulation part lasting for a first time period and a non-modulation part lasting for a second time period from a signal configured of a difference between a first signal and a second signal, wherein the first signal is supplied from the first extraction section based on the extraction of the first component, and the second signal is supplied from the second extraction section based on the extraction of the second component; and determining a timing of decoding based on the detection of the modulation part lasting for the first time period and the non-modulation part lasting for the second time period.

8. A signal processing device, comprising:

an extraction section that comprises:
- a first extraction section configured to extract a first signal obtained by removal of a first component at a first frequency from an obtained signal; and
- a second extraction section configured to extract a second signal obtained by removal of a second component at a second frequency, different from the first component, from the obtained signal; and a detection section configured to:
- detect a modulation part that lasts for a first time period and a non-modulation part that lasts for a second time period from a signal configured of a difference between the first signal supplied from the first extraction section and the second signal supplied from the second extraction section; and
- determine a time to decode based on the detection of the modulation part that lasts for the first time period and the non-modulation part that lasts for the second time period.

9. The signal processing device according to claim 8, wherein the first frequency is fc/32, where fc is a frequency of a carrier magnetic field.

10. The signal processing device according to claim 8, wherein the second frequency is fc/28, where fc is a frequency of a carrier magnetic field.

11. The signal processing device according to claim 5, wherein the detection section is further configured to set a third time tolerance which is a sum of the first time tolerance and the second time tolerance.

12. The signal processing device according to claim 1, wherein the detection section is further configured to detect a start of frame (SOF) based on a continuous detection of the modulation part for a determined time period.

* * * * *